May 21, 1929.   I. DOROGI ET AL   1,713,751
THIN WALLED RUBBER ARTICLES AND METHOD OF MANUFACTURING SAME
Filed May 10, 1928
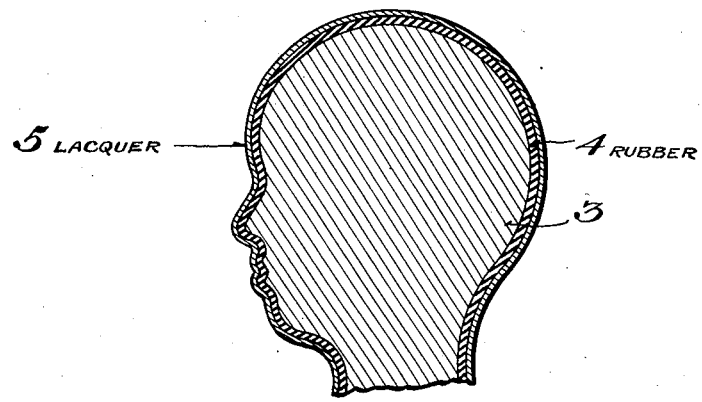
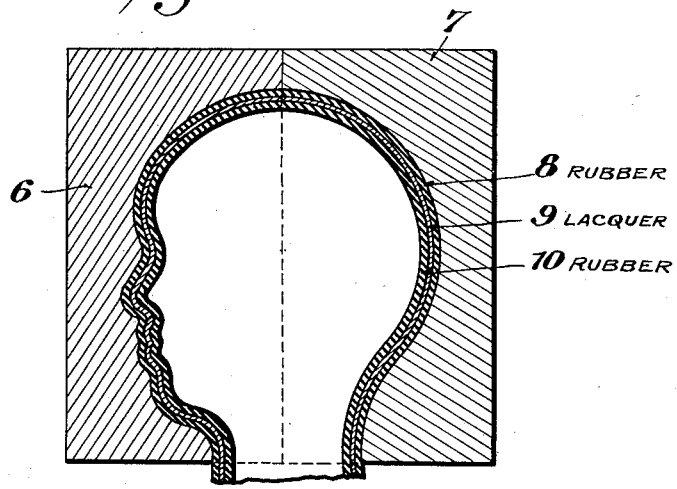
Inventors
I. Dorogi, L. Dorogi,
By Steward McKay
Attorneys Patented May 21, 1929.

1,713,751

UNITED STATES PATENT OFFICE.

ISTVÁN DOROGI AND LAJOS DOROGI, OF BUDAPEST, HUNGARY, ASSIGNORS OF ONE-HALF TO DR. DOROGI ES TARSA GUMMIGYAR R. T., OF BUDAPEST-ALBERTFALVA, HUNGARY, A LIMITED COMPANY OF HUNGARY.

THIN-WALLED RUBBER ARTICLES AND METHOD OF MANUFACTURING SAME.

Application filed May 10, 1928, Serial No. 276,801, and in Hungary April 11, 1927.

This invention relates to thin walled rubber articles and to methods of manufacturing same.

Thin walled rubber articles have the property (undesirable for many purposes) that when stressed—for example on inflation in the case of hollow toys or the like—there is no limit to their elongation properties, so that for example excessive stress, such as inflation, distorts the article out of the desired shape, on the one hand, and on the other hand may cause it to burst or tear. Up to the present it has not been possible to produce thin walled inflatable articles in such manner that they attained exactly the desired solid shape on inflation, because inflation itself was sufficient to distort the article out of the exact shape produced in the manufacturing process. Thus, for example, inflatable doll heads could never be produced by dipping, even with the use of absolutely accurate moulds, so that, on inflation, the shape of the mould was exactly reproduced. With articles produced from thin rubber sheets by die-stamp welding the production of the exact shape was again largely restricted owing to the small number and the flat shape of the rubber sheets forming the article. Moreover such inflatable articles were comparatively sensitive to damage, even a pin-prick being usually sufficient to cause the air to escape and to produce a hole which made the article useless, patching being troublesome and spoiling the appearance of the article. The thin walled rubber articles according to the invention are free from these disadvantages and consist of one or more layers of extensible rubber and the like, and of one or more flexible lacquer-like layers insoluble in water and preferably composed of cellulose derivatives, which layers adhere to the rubber layers and reduce the stretching of the rubber layer or layers by at least the half.

Although lacquer coatings are already known in connection with elastic and inflatable rubber articles, such layer of lacquer was always so weak or thin that it had no practical influence on the stretching of the rubber base. Consequently these lacquer-rubber articles, when subjected to stresses, behave almost exactly the same as those without lacquer.

Several embodiments of and methods for producing the rubber articles are given below.

The known inflatable articles such as representations of animals and the like, produced from two or more thin rubber sheets by die-stamp welding can be transformed into articles which accord with the invention, by providing their outer surfaces with a lacquer coating of such thickness as to restrict the stretching to the extent mentioned. This means, on the one hand, ensures the article against bursting on excessive inflation, because the lacquer layer is practically unstretchable and is of comparatively high tensile strength. Moreover, as a result of surface action, larger amounts of lacquer usually accumulate near the seams so that these weak points are particularly strengthened by the lacquering.

Inasmuch as these lacquer layers are generally unstretchable or only very nearly so, such figures in spite of their increased tensile strength cannot be inflated by the application of increased pressure, so as to produce any substantial change in the shape or cubic capacity assumed on lacquering. Under excessive pressures the article bursts without having sustained any substantial change in bulk.

The articles according to the invention are also proof against pin-pricks. They can be perforated many times by pin-pricks, without any escape of air taking place through the pin holes, since the rubber layer broken by the prick is forced by the internal pressure against the non-extensible, outer layer of lacquer and, being unable to stretch, closes the pin hole automatically.

The figures according to the invention have, moreover, the frequently desired property of greater rigidity, which may attain such a degree, that although the article is stretchable the inflated figure retains its shape even after the positive pressure has been relieved, so that for example, the image of a standing animal will remain standing even after the pressure has been relieved without altering its shape. In spite of this increased rigidity, the figure can be deflated, for example for packing purposes, by being pressed together.

If the lacquering is applied to the half inflated or uninflated figure, the finished figure, on being inflated, will practically have the shape determined by the surface of the welded rubber sheets in conjunction with the curvatures produced by the inflation. If however the figure has been lacquered in the inflated state, the finished figure, when inflated, will be a counterpart of the shape assumed during the lacquering or subsequent drying. Naturally, such figures may be provided not only all over with the lacquering adapted to limit the stretching of the rubber base, but also on individual parts, so that the figures will stretch extensively in some parts and practically not at all in others, by which means, various new effects can be obtained. It is also selfunderstood that transition stages displaying progressively decreasing extensibility in the direction of the lacquered surface can be arranged between the stretchable and unstretchable parts. Thus for example, representations of an animal can be provided with an unstretchable head and fairly rigid feet, but with an extensible body, so that for example, the neck will stretch progressively in the parts nearest the body.

The lacquering of the exterior surface of the figures can be effected by dipping in a suitable solution, in the uninflated or inflated state, or by spraying and the like. By repeated spraying or dipping, the thickness of the layers can be increased as desired throughout or in parts. The lacquers may of course vary in quantity, colour, transparency and the like. The lacquer layer may also serve as an adhesive layer for ornamental substances such as long and short hairs, fibres, spangles, bronze, luminous powder and the like applied to the still sticky lacquer, for example by blowing or spraying.

Instead of being lacquered from the outside, such figures can also be lacquered from the interior by filling the rubber figure with the lacquer solution and then emptying same, and drying the residual lacquer with a current of air, passed through the figure. It is self-understood that, in drying, care must be taken to restrict the outlet so far that drying proceeds with the figure in the desired state of inflation.

In many cases the drying of the interior lacquer layer can be effected in the inflated and closed state of the article, if, for example, the solvent (for example amyl alcohol and the like) is able to diffuse through the rubber layer.

If the lacquering is effected in this way, the drying of the lacquer coating can be combined with the partial modelling of the article. For this purpose the thin-walled articles produced, for example, from thin sheets cemented or welded together or by dipping must be coated inside with a layer of moist lacquer. If this lacquer layer were dried in a more or less inflated state, in accordance with the earlier paragraphs, the shape or dimensions of the finished figure would be those determined by the original shape of the uninflated rubber skin and the interior pressure prevailing during the drying of the lacquer layer.

If however, during the drying process, the entire figure or parts of same are pressed into a negative mould in such a way that the thin rubber wall adopts itself to the mould, it is evident that the lacquer layer inside the rubber skin will dry in the form of the modelled surface. Inasmuch as the lacquer layer tends to retain the shape obtained in drying, that part of the article which has been lacquered in this way will assume, on inflation, almost exactly the solid form corresponding to the model. It is thus possible by this means to produce exceedingly well-modelled articles from far thinner rubber than could hitherto be used for even roughly moulded articles. For example a doll's head, animal's head and the like can be made with equal ease in this manner, from one and the same dipped hollow cylindrical rubber article, by lacquering in a suitable mould.

On the other hand well-modelled doll's heads for example can also be produced by coating a positive model with the thin rubber layer by dipping in known manner, and then providing part of this rubber layer, especially the face, with a lacquer layer and drying. The part of the rubber layer left unlacquered at the back of the head, allows of stretching and enables the head to be stripped from the dipping model. After stripping the doll's head it can be further strengthened if desired, lacquered internally or externally, ornamented and/or otherwise treated.

Some times it may be desired to cover the exterior or interior lacquer layer entirely or partially with a layer of rubber, which can be effected by dipping or spraying with a rubber solution or by known kinds of precipitation from dispersions.

A further possibility of forming well-modelled parts, such as heads, consists in providing a negative mould (by dipping or the like), with a thin rubber film to prevent adhesion of the lacquer layer to the mould, this film being lacquered upon the mould. An inflatable hollow article which has been made adhesive at suitable points (for example by coating with a still moist lacquer layer) is completely pressed, by inflation, against the lacquer layer in the negative mould, and is thereby cemented to the hollow rubber body, whereupon the thin rubber layer produced by dipping is taken out the negative mould. Such an article will thus consist, at the points in question, of an inner rubber layer, a duplicate lacquer layer covering this rubber layer, and a very thin outer layer of rubber.

The special property of the articles according to the invention, namely of retaining the shape and dimensions obtained during the drying of the lacquer layer, in combination with the increased rigidity, enables individual parts of such articles to be produced from other kinds of rigid or semi-rigid substances. In toys, for example, the body of a doll may be formed of lacquered thin rubber sheets, made according to the invention, whilst, for example, the head, or merely the face, hands or feet, may consist, in known manner of celluloid or solid or semi-solid rubber or of a moulding composed of any other desired substance, the same being united to the rubber body preferably by adhesion.

In the production of such toys consisting of two different substances for example a rubber doll with celluloid head, the preferred method is first to finish the headless rubber body, which is closed at the neck, and after vulcanization (and lacquering on occasion), the neck is cut open and the neck stump of the doll's head is cemented on. Inasmuch as the lacquering prevents the neck from stretching beyond the predetermined width, even under excessive interior air pressure, the join will never show the unsightly swelling always unavoidable in similar dolls experimentally made with celluloid heads and an unlacquered rubber body. Moreover the increased rigidity of the lacquered rubber walls ensures a correct position of the head, which in the case of unlacquered and consequently soft doll's heads can only be obtained with certainty when the celluloid head is very light or the walls of the rubber body disproportionally thick.

In the accompanying drawings:

Figure 1 is a vertical section through a doll's head and the positive mould or model on which it is made.

Figure 2 is a vertical section through another form of construction of a doll's head and the negative mould used in making the same.

In Figure 1 is shown a positive model 3 of a doll's head, to which a thin rubber layer 4 has been applied and the face portion thereof given a coating 5 of lacquer. The doll's head so formed is ready to be stripped from the model which can be accomplished by stretching the unlacquered portions of the rubber layer at the back of the head and the neck.

In Figure 2 is shown a negative mould of a doll's head, conveniently formed in two parts 6 and 7. A layer of rubber 8 has been applied to the interior surface of this mould and this layer, in turn, has been coated with lacquer 9. Finally, before the lacquer coating lost its adhesive qualities, a second layer of rubber 10 was pressed into contact with the lacquer coating by fluid pressure. The doll's head so formed is ready to be stripped from the mould which may be accomplished either by separating the two parts of the mould or by deflating the head.

The toys constructed according to the invention from two or more different substances combine many advantages of the component substances without their disadvantages. Thus for example, a well modelled celluloid doll's head can be cheaply produced by simple pressing, whilst on the other hand the lacquered rubber body is unbreakable and is also cheaper than a corresponding celluloid body made by cementing several parts together.

In a similar manner, the hands and feet of the figures which, in the existing toys are rather unshapely, can be replaced by well shaped parts made of other materials.

Amongst other advantages, the use, for example of feet shaped from loaded ebonite, enables such toys to stand more firmly.

The expression "rubber and the like" implies in the scope of the present invention, not only rubber, but also rubber substitutes, gutta percha, regenerated rubber, and mixtures of same with or without filling, colours and other substances.

The expression "lacquering solutions" implies not only the solutions and swellings of ordinary lacquers and the like, but also of cellulose derivatives in organic solvents, as also such solutions or swellings, such as viscose solutions from which films of low stretching capacity can be produced by coagulation.

If the lacquer layer is formed of a substance which like celluloid is plastic when heated, the unfinished modelled article which has been coated with the dried lacquer layer, can be given its final shape by hot stamping. In this case it is advantageous to heat not the mould but the article, so that the latter may cool and solidify while being pressed against the mould.

Naturally in this case only a negative mould will generally be needed, against which the surface of the article to be shaped may be forced, for example, by air pressure.

Such celluloid layers adhering to a rubber base exhibit the peculiarity that, although they will ignite by contact with a flame, the ignition does not proceed any further, the layer burning only at the points ignited by the flames.

Having now particularly described and ascertained the nature of our said invention and in what manner the same is to be performed, we declare that what we claim is:—

1. An article comprising a thin layer of stretchable rubber provided with a coating of flexible, relatively inelastic, lacquer-like material adapted to cause the article, whilst inflated, to retain such form and, when re-inflated after collapsing, to reproduce such form.

2. An article comprising a thin layer of stretchable rubber having one portion capable of expanding freely when inflated and another portion provided with a coating of flexible, relatively inelastic lacquer-like material adapted to cause such portion of the article, when the article is inflated, to retain such form and, when re-inflated after collapsing, to reproduce such form.

3. An article as in claim 1 in which the flexible coating is on the inside of the rubber layer.

4. An article as in claim 1 in which the flexible coating is on the inside of the rubber layer and a second rubber layer is located inside the said flexible coating.

5. An article as in claim 1 in which the flexible coating contains cellulose derivatives.

6. The process of manufacturing thin-walled collapsible rubber articles including applying a rubber layer to the surface of a mould and whilst in contact with the latter applying thereto a flexible but relatively inelastic coating of lacquer-like material.

7. The process of manufacturing thin-walled collapsible rubber articles including applying a rubber layer to the inner surface of a mould and then applying to the inside of said layer a flexible but relatively inelastic coating of lacquer-like material.

8. The process of manufacturing thin-walled collapsible rubber articles including covering the inner surface of a mould with a layer of rubber, applying a flexible but relatively inelastic coating of lacquer-like material to the rubber, and then pressing a second layer of rubber into contact with said coating by fluid pressure before said coating has lost its adhesive qualities.

In testimony whereof we affix our signatures.

ISTVÁN DOROGI.
LAJOS DOROGI.